United States Patent
Walter et al.

(10) Patent No.: US 11,485,277 B2
(45) Date of Patent: Nov. 1, 2022

(54) METHOD AND SYSTEM FOR DEDUCING A REDUCED IMAGE REFRESH FREQUENCY IN HIGH DEFINITION HEADLIGHTS

(71) Applicant: Dr. Ing. h.c. F. Porsche Aktiengesellschaft, Stuttgart (DE)

(72) Inventors: Dominik Walter, Leinfelden-Echterdingen (DE); Johannes Grabowski, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/540,696

(22) Filed: Dec. 2, 2021

(65) Prior Publication Data

US 2022/0176872 A1 Jun. 9, 2022

(30) Foreign Application Priority Data

Dec. 3, 2020 (DE) .................... 10 2020 132 161.9

(51) Int. Cl.
*B60Q 1/14* (2006.01)
*G09G 3/22* (2006.01)

(52) U.S. Cl.
CPC ............. *B60Q 1/1423* (2013.01); *G09G 3/22* (2013.01); *B60Q 2300/054* (2013.01); *G09G 2320/062* (2013.01); *G09G 2320/103* (2013.01); *G09G 2354/00* (2013.01); *G09G 2360/14* (2013.01); *G09G 2380/10* (2013.01)

(58) Field of Classification Search
CPC .. B60Q 1/1423; B60Q 2300/054; G09G 3/22; G09G 2320/062; G09G 2320/103
See application file for complete search history.

(56) References Cited

U.S. PATENT DOCUMENTS

2009/0147861 A1* 6/2009 Schnebly ............... H04N 7/183
375/240.27

FOREIGN PATENT DOCUMENTS

| DE | 102012218320 | 4/2014 |
| DE | 102016012502 | 5/2017 |
| DE | 102016103037 | 8/2017 |
| DE | 10201812453 | 4/2020 |

OTHER PUBLICATIONS

German Search Report dated May 4, 2021.

* cited by examiner

*Primary Examiner* — Priyank J Shah
(74) *Attorney, Agent, or Firm* — Gerald E. Hespos; Michael J. Porco

(57) ABSTRACT

A method is provided for monitoring an image refresh frequency of HD headlights for a vehicle. The HD headlight has a control unit that causes a display with light point sources to generate light images in continued temporal succession for a predefined time duration. An image refresh frequency corresponding to the inverse of the predefined time duration is updated by a next light image. A video signal composed of image information items and signal information items is provided to the control unit by a video interface that impresses the temporally changing information item on the signal information items of the video signal. The control unit checks the signal information items of the video signal with respect to the temporally changing information item to assess correspondence with the temporal succession available to the HD headlight and a substitute reaction of the HD headlight is initiated in the event of erroneous correspondence.

12 Claims, 2 Drawing Sheets

METHOD AND SYSTEM FOR DEDUCING A REDUCED IMAGE REFRESH FREQUENCY IN HIGH DEFINITION HEADLIGHTS

CROSS REFERENCE TO RELATED APPLICATION

This application claims priority under 35 USC 119 to German Patent Appl. No. 10 2020 132 161.9 filed on Dec. 3, 2020, the entire disclosure of which is incorporated herein by reference.

BACKGROUND

Field of the Invention

This invention relates to a method and a system for deducing a reproduction error in high definition (HD) matrix headlights of vehicles, wherein the reproduction error is a deviation from a predefined image refresh frequency.

Related Art

High definition (abbreviated to "HD") main headlights of a vehicle generate light images in an area in front of the vehicle. The headlights obtain video signals corresponding to the light images with a predefined image refresh frequency via a video interface. The prior art discloses a number of methods that are intended to guarantee an error-free data transmission from a video interface.

DE 10 2018 124 530 A1 proposes a device for outputting images in a manner that can be validated by an observer. More particularly, a camera provides a temporally changing camera image, and a temporally variable signature is projected into a camera optical unit so that an observer of the camera image can recognize a frozen camera image as an image transmission error.

DE 10 2016 013 502 A1 describes a method for monitoring a data transmission for transmission errors. In particular, a total image stream containing a predefined check image sequence is transmitted from a transmitter to a receiving device. An evaluation unit at the receiver end, checks an instantaneous state of the check sequence for a deviation from a predefined target value.

DE 10 2016 103 037 A1 relates to a method for checking a functionality of a camera monitor system for a motor vehicle. The method includes storing additional information together with input image data generated by a camera in an input image file. A test device of the camera monitor system ascertains the functionality of the system on the basis of the additional information.

Currently available HD matrix headlight systems cannot detect a frozen video signal. The term "frozen" is used by a person skilled in the art to denote a video signal that is not updated with the predefined image refresh frequency. The scheduled updating of the video signal may fail to occur if a video processing control device does not carry out image updating, e.g., due to an internal software error. Moreover, a reduction of the image refresh frequency can occur due to an excessive number of computation operations, and this cannot be recognized at the present time. Both error possibilities must be avoided to ensure traffic safety of the headlight system during operation of a vehicle, and the system must not cause other road users to be dazzled.

An object of the invention is to provide a method for monitoring HD headlights in which a video signal of the video interface is checked in regard to its image refresh frequency. The checking is to be effected between the HD headlight system and the video interface. A system also is provided to implement the method.

SUMMARY

A method for monitoring an image refresh frequency of high definition (HD) headlights is provided. At least one HD matrix headlight or HD headlight designed for a vehicle has a control unit and a light source. The light source has a display with a multiplicity of light point sources, and the control unit causes the light source to generate light images in continued temporal succession for a predefined time duration. Each light image is updated by a respective next light image at a predefined image refresh frequency corresponding to the inverse of the predefined time duration. With respect to the predefined image refresh frequency, a video signal composed of image information items and signal information items is provided to the control unit of the at least one HD headlight by a video interface. A temporally changing information item is impressed on the signal information items of the video signal by the video interface. The control unit of the at least one HD headlight checks the signal information items of the video signal with respect to the temporally changing information item and assesses correspondence with the temporal succession available to the at least one HD headlight. The control unit then initiates a substitute reaction of the at least one HD headlight in the event of erroneous correspondence.

The signal information items of the video signal also are referred to as META-data by those skilled in the art. The image information items contain image data formed, e.g., from image information units, so-called pixels, strung together in lines. These signal information items can be attached to the image data in additional lines. According to the invention, the temporally changing information item is introduced in the additional lines, e.g., by virtue of the fact that for this purpose at a location in the additional lines at least one information unit corresponding to an individual pixel of the image data is agreed between the video interface and the HD headlight.

The predetermined image refresh frequency can be, e.g., 60 fps, where "fps" is the abbreviation of "frames per second". This corresponds to a predefined time duration of 16 ms, following which the at least one HD headlight expects an updated video signal from the video interface. An absence of the temporal change in the information unit agreed for this purpose in the signal information items of the video signal enables the control unit of the HD headlight to recognize that a currently reproduced light image, e.g., cannot be adapted to events in the meantime, e.g., possible changes in a current traffic situation. According to the invention, the control unit thus initiates a substitute reaction for the sake of safety.

In one embodiment of the method, the temporally changing information item is represented by a single byte. In this case, the single byte assumes a value that changes between 0x0 and 0x255 with respect to each time step. In order to be able to ascertain an interruption in a direct succession of video signals provided with the predefined image frequency, e.g., a change from 0x0 (corresponding to "black") to 0x255 (corresponding to "white") and again to 0x0, the change alternating with the predefined image frequency, is sufficient.

In one embodiment of the method, the single byte is incremented bit by bit with respect to each time step. Thus, the HD headlight can advantageously recognize deviations from the temporal succession in a simple manner if a single incremental counter value running with the image refresh frequency in the control unit leads to a deviation from the value of the single byte being incremented bit by bit in the signal information item.

In a further embodiment, the erroneous correspondence is formed by a reduced image refresh frequency of the video signal provided by the video interface vis-à-vis the predefined image refresh frequency. The control unit deduces a value of the reduced image refresh frequency from the temporally changing information item. For this purpose, the control unit can use a temporal reference, such as the incremental counter running in the control unit or a time signal provided via a CAN (controller area network) bus, in order, through comparison with the temporally changing information item, to deduce a deviation factor between the video signals provided by the video interface with reduced image frequency and the predefined image refresh frequency.

In yet another embodiment, the substitute reaction of the at least one HD headlight is formed by a renewed reproduction of the respective light image. This can be done, e.g., if the respective light image, within standard specifications, does not constitute a hazard for possible oncoming traffic.

In another refined embodiment, the substitute reaction of the at least one HD headlight is formed by a reproduction of a light image corresponding to a low-beam light.

The invention also relates to a system for monitoring an image refresh frequency of HD headlights. The system comprises at least one HD headlight designed for a vehicle and a video interface. The at least one HD headlight comprises a control unit and, as a light source, has a display having a multiplicity of light point sources. The at least one HD headlight is designed to generate a respective light image in continued temporal succession for a predefined time duration by means of the control unit, and to update the respective light image, with respect to a predefined image refresh frequency corresponding to the inverse of the predefined time duration, by a respective next light image. The video interface is designed, with respect to the predefined image refresh frequency, to provide a video signal composed of image information items and signal information items to the control unit of the at least one HD headlight and to impress a temporally changing information item on the signal information items of the video signal. The control unit of the at least one HD headlight is designed to check the signal information items of the video signal, in regard to the temporally changing information item, for correspondence with the temporal succession available to the at least one HD headlight and to initiate a substitute reaction of the at least one HD headlight in the event of erroneous correspondence.

In one configuration of the system, the temporally changing information item is represented by a single byte. The single byte assumes a value that changes between 0 and 255 with respect to each time step.

In a refined configuration of the system, the value of the single byte is increased bit by bit with respect to each time step.

In a further configuration of the system, the erroneous correspondence is formed by a reduced image refresh frequency of the video signal provided by the video interface vis-à-vis the predefined image refresh frequency. The control unit additionally may be designed to deduce a value of the reduced image refresh frequency from the temporally changing information item.

In yet another configuration of the system, the substitute reaction of the at least one HD headlight is formed by a renewed reproduction of the respective light image.

In a further configuration of the system, the substitute reaction of the at least one HD headlight is formed by a reproduction of a light image corresponding to a low-beam light.

Further advantages and configurations of the invention are evident from the description and the accompanying drawing.

It goes without saying that the features mentioned above and those yet to be explained below can be used not only in the combination respectively indicated, but also in other combinations or by themselves, without departing from the scope of the present invention.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

Figure 1:
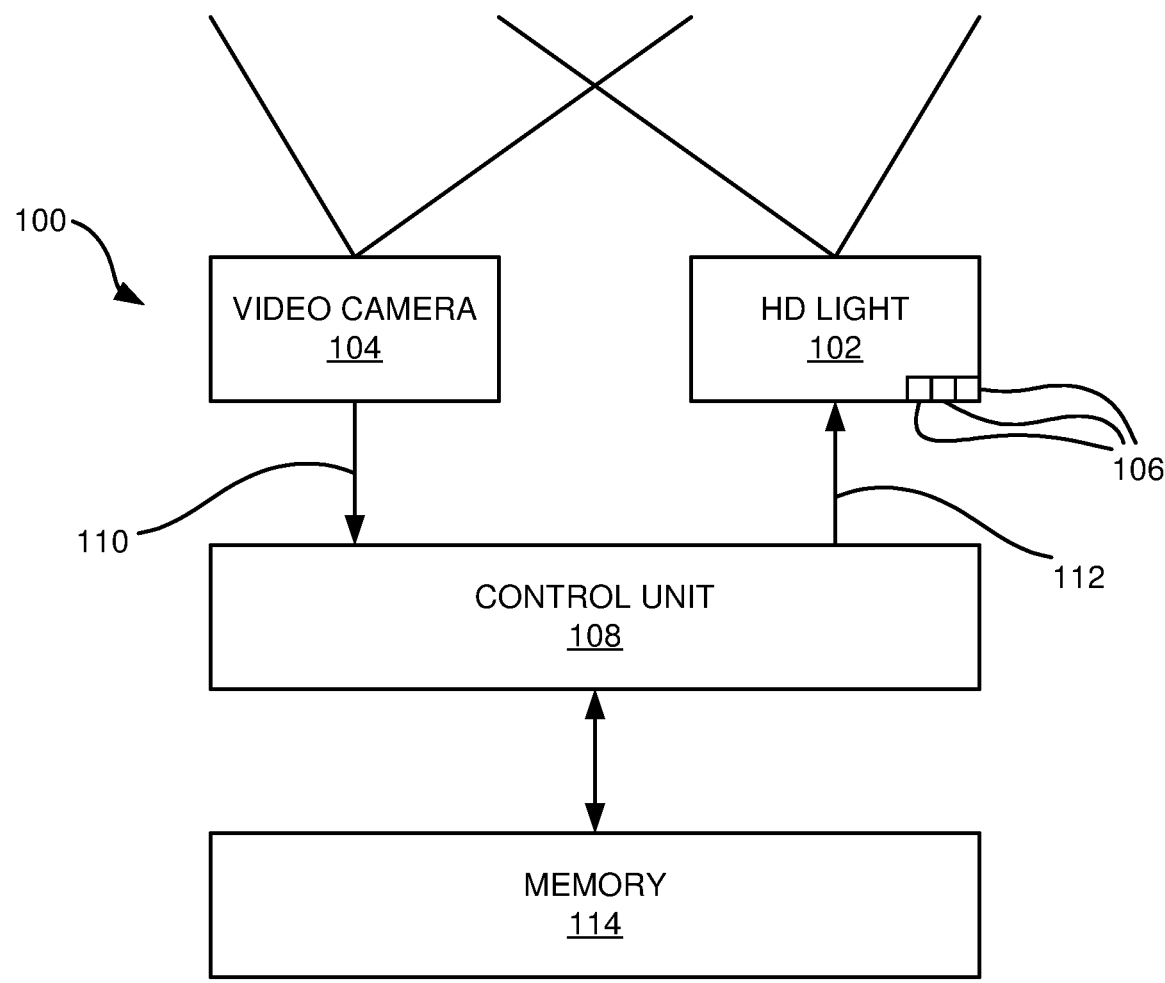
FIG. 1 is a schematic illustration of a high-definition (HD) headlight system in accordance with one embodiment of the invention.

FIG. 1 is a schematic illustration of a high-definition (HD) vehicular headlight system 100 in accordance with one embodiment of the invention. The headlight system 100 includes a headlight 102 and a video camera 104. The headlight 102 includes a multiplicity of light point sources 106. The headlight system 100 further includes a control unit 108 connected to the video camera 104 by a video interface 110. It is to be appreciated that the video camera 104 may include various known image capturing devices including, but not limited to, CCD (charge-coupled device) image capture devices, active-pixel sensor type devices (i.e., CMOS (complementary metal-oxide semiconductor) sensor devices), etc. Additionally, the video interface 110 may include any interface configured to receive a video signal from the video camera 104 and convert and/or format the received video signal into a format compatible with the control unit 108, whether analog or digital. The video interface 110 may include, but not limited to, a USB interface, a HDMI interface, VGA interface, etc.

The control unit 108 further is connected to the respective headlight 102 by a signal line 112 that controls the respective light point sources 106. A memory 114 is connected to the control unit 108 and stores data of video signals received from the video camera 104 as explained further herein.

Figure 2:
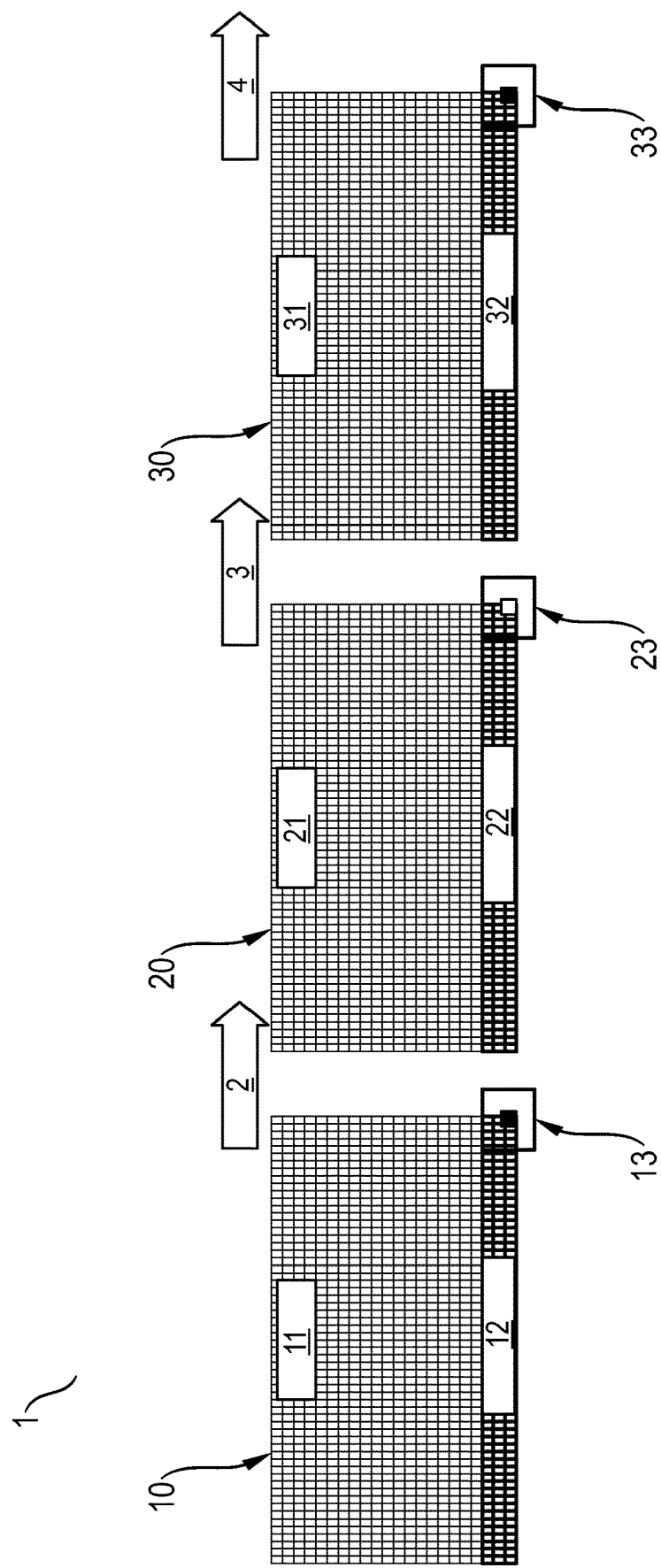
FIG. 2 is a schematic flow diagram with respect to a temporal succession of respective video signals in one embodiment of the method according to the invention.

FIG. 2 is a schematic flow diagram 1 with respect to a temporal succession of video signals 10, 20, 30 in one embodiment of the method of the invention. The video signals 10, 20, 30 are composed respectively of image information items 11, 21, 31 and a signal information item 12, 22, 32 and, after a predetermined time duration of, e.g., 16 ms 2, 3, 4, the video signals 10, 20, 30 are intended to be provided to a control unit 108 of a high definition headlight or HD headlight 102 in an updated manner by a video interface 110. Thus, the video signal 20 is intended to have been updated from the video signal 10, and the video signal 30 is intended to have been updated from the video signal 20. A temporal information item 13, 23, 33 is formed as the last information unit of the respective signal information item 12, 22, 32, and is defined by a temporally changing value that is impressed on the respective video is achieved in this embodiment by changing a byte between 0x0 (black), as indicated by the reference numerals 13, 33 in FIG. 2 and 0x255 (white), as indicated by the reference numeral 23 on the FIG. 2, with respect to the video signal 10, 20, 30 (respectively illustrated in an enlarged manner in FIG. 2). On the basis of this temporal information item 13, 23, 33, the control unit 108 of the HD headlight 102, said control unit 108 having a dedicated time signal (e.g. a counter concomitantly running with the time duration of 16 ms 2, 3, 4), ascertains whether a respectively updated video signal 10, 20, 30 is provided by a video interface 110. In particular, a temporal information item 13, 23, 33 that remains the same over two or more successive time durations 2, 3, 4 or steps is interpreted by the control unit 108 as indicating image information items 11, 21, 31 that are erroneous due to, e.g., an erroneous operation of the video camera 104. The control unit 108 then initiates a substitute reaction of the at least one HD headlight 102 in the event of erroneous correspondence. Such a substitute reaction may be to switch to an equivalent to a low beam illumination.

In the context of this disclosure, a "control unit" can be understood to include, for example, a processor and/or a storage unit or memory for storing algorithms and program commands. By way of example, the processor and/or the control unit is specifically configured to carry out program commands in such a way that the processor and/or the control unit carries out functions to implement or realize a method as disclosed herein or a step of a method as disclosed herein. The term control unit is used here synonymously with devices known from the prior art. A control unit, therefore, encompasses a "computer" and accordingly comprises one or more general-purpose processors (CPUs) or microprocessors, RISC processors, GPUs and/or DSPs. The control unit or computer has for example additional elements such as storage interfaces of communication interfaces. Optionally or additionally, the terms "control unit" and "computer" refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

Each temporal information item 13, 23, 33 may be stored temporarily in a memory or storage unit 114. In the context of this disclosure, a "memory" or "storage unit" can be understood to mean, for example, a volatile memory in the form of random access memory (RAM) or a permanent memory such as a hard disk drive or a data medium or, for example, a replaceable storage module or a cloud-based storage solution. The memory or storage unit 114 can be accessed by the control unit 108, which then compares each successive temporal information item 13, 23, 33 to a preceding temporal information item 13, 23, 33 for purposes of determining whether the video signal 10, 20, 30 has been updated.

LIST OF REFERENCE SIGNS

1 Schematic flow diagram
2 Time step 16 ms
3 Time step 16 ms
4 Time step 16 ms
10 Video signal in the first time step
11 Image information item
12 Signal information item
13 Temporal information item
20 Video signal in the second time step
21 Image information item
22 Signal information item
23 Temporal information item
30 Video signal in the third time step
31 Image information item
32 Signal information item
33 Temporal information item
100 System
102 Headlight
104 Video camera
106 Light point sources
108 Control unit
110 Video Interface
112 Signal line
114 Memory

What is claimed is:

1. A method for monitoring an image refresh frequency of at least one HD headlight as a light source of a vehicle, the vehicle having a control unit, the at least one HD headlight comprising a display having a multiplicity of light point source that generate light images in a continued temporal succession for a predefined time duration by means of the control unit, each light image being updated by a respective next light image at a predefined image refresh frequency corresponding to an inverse of the predefined time duration, the method comprising:

using a video interface to provide video signals to the control unit at the predefined image refresh frequency, each of the video signals being composed of image information items and signal information items;

impressing a temporally changing information item on the signal information items of the video signal;

using the control unit to check a current one of the temporally changing information items to a preceding one of the temporally changing information items for correspondence; and initiating a substitute reaction of the at least one HD headlight in the event of erroneous correspondence indicated by the current information item that has not been changed with respect to the preceding one of the temporally changing information items.

2. The method of claim 1, wherein the temporally changing information item is represented by a single byte, and the single byte assumes a value that changes between 0 and 255 with respect to each time step.

3. The method of claim 2, wherein the single byte is incremented bit by bit with respect to each time step.

4. The method of claim 1, wherein the erroneous correspondence is formed by a reduced image refresh frequency of the video signal provided by the video interface vis-à-vis the predefined image refresh frequency, and wherein the control unit deduces a value of the reduced image refresh frequency from the temporally changing information item.

5. The method of claim 1, wherein the substitute reaction of the at least one HD headlight is formed by a renewed reproduction of the respective light image.

6. The method of claim 1, wherein the substitute reaction of the at least one HD headlight is formed by a reproduction of a light image corresponding to a low-beam light.

7. A system for monitoring an image refresh frequency of at least one HD headlight as a light source of a vehicle, the at least one HD headlight including a display having a multiplicity of light point sources, the system comprising:
   a control unit connected to the at least one HD headlight and causing the at least one HD headlight to generate light images in continued temporal succession for a predefined time duration, and to update the respective light images with a respective next light image at a predefined image refresh frequency corresponding to an inverse of the predefined time duration; and
   a video interface that provides a video signals to the control unit at the predefined image refresh frequency, the video signal being the composed of image information items and signal information items of the at least one HD headlight and the video interface impressing a temporally changing information item on the signal information items of the video signal, wherein the control unit checks the signal information items of the video signal with respect to the temporally changing information item, for correspondence with the temporal succession available to the at least one HD headlight and initiates a substitute reaction of the at least one HD headlight in the event of erroneous correspondence.

8. The system of claim 7, wherein the temporally changing information item is represented by a single byte, and wherein the single byte assumes a value that changes between 0 and 255 with respect to each time step.

9. The system of claim 8, wherein the value of the single byte increases bit by bit with respect to each time step.

10. The system of claim 7, wherein the erroneous correspondence is formed by a reduced image refresh frequency of the video signal provided by the video interface vis-à-vis the predefined image refresh frequency, and wherein the control unit is designed to deduce a value of the reduced image refresh frequency from the temporally changing information item.

11. The system of claim 7, wherein the substitute reaction of the at least one HD headlight is formed by a renewed reproduction of the respective light image.

12. The system of claim 7, wherein the substitute reaction of the at least one HD headlight is formed by a reproduction of a light image corresponding to a low-beam light.

* * * * *